(12) United States Patent
Du et al.

(10) Patent No.: US 12,386,548 B2
(45) Date of Patent: Aug. 12, 2025

(54) BUFFER MANAGEMENT APPARATUS THAT USES PURE HARDWARE TO MANAGE BUFFER BLOCKS CONFIGURED IN STORAGE MEDIUM AND ASSOCIATED BUFFER MANAGEMENT METHOD

(71) Applicant: Airoha Technology (Suzhou) Limited, Suzhou (CN)

(72) Inventors: Peng Du, Nanjing (CN); Fei Yan, Nanjing (CN)

(73) Assignee: Airoha Technology (Suzhou) Limited, Suzhou (CN)

( * ) Notice: Subject to any disclaimer, the term of this patent is extended or adjusted under 35 U.S.C. 154(b) by 0 days.

(21) Appl. No.: 18/211,243

(22) Filed: Jun. 17, 2023

(65) Prior Publication Data

US 2024/0036761 A1 Feb. 1, 2024

(30) Foreign Application Priority Data

Aug. 1, 2022 (CN) .......................... 202210915189.1

(51) Int. Cl.
*G06F 3/06* (2006.01)
(52) U.S. Cl.
CPC ............ *G06F 3/0656* (2013.01); *G06F 3/064* (2013.01); *G06F 3/0604* (2013.01); *G06F 3/0679* (2013.01)
(58) Field of Classification Search
CPC ...... G06F 3/0656; G06F 3/064; G06F 3/0604; G06F 3/0679; G06F 3/061; G06F 3/0658; G06F 3/0671; G06F 5/06; G06F 13/12; G06F 13/1673; G06F 13/28; G06F 12/0877; G06F 12/0871
See application file for complete search history.

(56) References Cited

U.S. PATENT DOCUMENTS

| | | | |
|---|---|---|---|
| 8,704,128 B2 * | 4/2014 | Beck .................... | B23K 26/389 29/889.721 |
| 10,210,089 B2 * | 2/2019 | Herrmann ............... | H04L 49/90 |
| 2004/0003148 A1 * | 1/2004 | Ali-Santosa ............ | G06F 9/463 710/52 |
| 2010/0299460 A1 * | 11/2010 | Wang ........................ | G06F 5/06 710/52 |
| 2014/0082265 A1 * | 3/2014 | Cheng ................. | G06F 12/0246 711/103 |
| 2018/0225204 A1 * | 8/2018 | Choudhari .......... | G06F 12/0806 |
| 2018/0275898 A1 * | 9/2018 | Bhansali ................ | G06F 11/14 |
| 2019/0042473 A1 * | 2/2019 | Bhaskar .................. | G06F 21/78 |
| 2021/0182190 A1 * | 6/2021 | Gao ..................... | G06F 12/0246 |
| 2023/0143926 A1 * | 5/2023 | Inbar ..................... | G06F 3/0644 711/154 |

FOREIGN PATENT DOCUMENTS

| | | |
|---|---|---|
| TW | 535059 | 6/2003 |
| TW | I446766 | 7/2014 |
| TW | 201706829 A | 2/2017 |
| TW | 201830256 A | 8/2018 |
| TW | I779938 B | 10/2022 |

* cited by examiner

*Primary Examiner* — Zhuo H Li
(74) *Attorney, Agent, or Firm* — Winston Hsu

(57) ABSTRACT

A buffer management apparatus includes a plurality of registers and a buffer block management circuit. The buffer block management circuit is used to communicate with software through the plurality of registers, and utilize pure hardware to manage a plurality of buffer blocks configured in a storage medium, for allowing the software to perform data access upon the plurality of buffer blocks.

18 Claims, 8 Drawing Sheets

BUFFER MANAGEMENT APPARATUS THAT USES PURE HARDWARE TO MANAGE BUFFER BLOCKS CONFIGURED IN STORAGE MEDIUM AND ASSOCIATED BUFFER MANAGEMENT METHOD

BACKGROUND OF THE INVENTION

1. Field of the Invention

The present invention relates to buffer management, and more particularly, to a buffer management apparatus that uses pure hardware to manage buffer blocks configured in a storage medium and an associated buffer management method.

2. Description of the Prior Art

With the growing popularity of virtualization, the demand for bandwidth increases continuously. Hence, packet forwarding devices at network nodes need stronger data processing capabilities. Especially, for network edge devices, they need to transmit data over multiple media with different transmission rates, and need to meet various quality of service (QoS) strategies for networks with different bandwidth. These ever-growing network throughput demands challenge the limited resources in embedded devices, especially the constrained buffer management. The conventional solution is to use software to deal with buffer management. However, the allocation and release of buffer blocks need to occupy processor resources. In addition, for a case where multiple processors perform concurrent access, using the software to deal with buffer management will need a lock mechanism to provide protection, but this will take up a lot of processor resources and affect the efficiency of concurrent access.

SUMMARY OF THE INVENTION

One of the objectives of the claimed invention is to provide a buffer management apparatus that uses pure hardware to manage buffer blocks configured in a storage medium and an associated buffer management method.

According to a first aspect of the present invention, an exemplary buffer management apparatus is disclosed. The exemplary buffer management apparatus includes a plurality of registers and a buffer block management circuit. The buffer block management circuit is arranged to communicate with software through the plurality of registers, and utilize pure hardware to manage a plurality of buffer blocks configured in a storage medium, for allowing the software to perform data access upon the plurality of buffer blocks.

According to a second aspect of the present invention, an exemplary buffer management method is disclosed. The exemplary buffer management method includes: enabling communication between pure hardware and software through a plurality of registers, and utilizing the pure hardware to manage a plurality of buffer blocks configured in a storage medium, for allowing the software to perform data access upon the plurality of buffer blocks.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
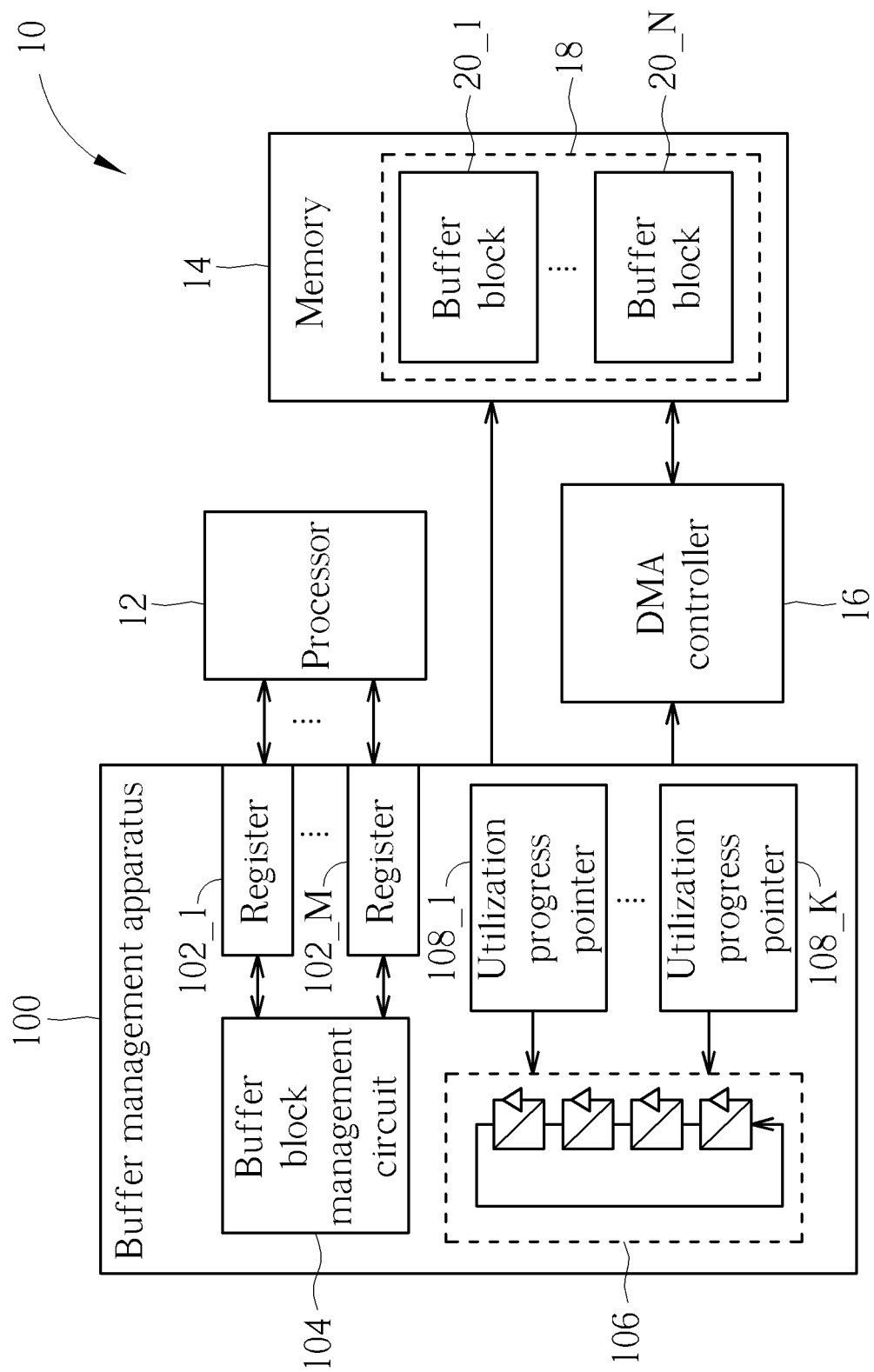
FIG. 1 is a diagram illustrating a buffer management apparatus according to an embodiment of the present invention.

FIG. 1 is a diagram illustrating a buffer management apparatus according to an embodiment of the present invention. The buffer management apparatus 100 may be employed by high-throughput forwarding equipment 10. However, this is for illustrative purposes only, and is not meant to be a limitation of the present invention. That is, any equipment using the proposed buffer management apparatus 100 falls within the scope of the present invention. As shown in FIG. 1, in addition to the buffer management apparatus 100, the high-throughput forwarding equipment 10 further includes a processor 12, a memory 14, and a direct memory access (DMA) controller 16. The processor 12 may be a central processing unit (CPU) or a neural network processing unit (NPU), and is arranged to load and execute software SW to deal with receiving and forwarding of network packets. A storage medium of the high-throughput forwarding equipment 10 may be implemented using the memory 14 or any component that is capable of achieving data buffering. In this embodiment, the memory 14 may be a dynamic random access memory (DRAM). The DMA controller 16 is capable of directly accessing (reading and writing) the memory 14 without intervention of the processor 12. Since the present invention is focused on the buffer management apparatus 100 and a person skilled in the art can readily understand principles of the processor 12, the memory 14 and the DMA controller 16, further description of the processor 12, the memory 14 and the DMA controller 16 is omitted here for brevity.

The buffer management apparatus 100 includes a plurality of registers 102_1-102_M and a buffer block management circuit 104. The registers 102_1-102_M are arranged to act as a communication interface between software and pure hardware. The buffer block management circuit 104 is implemented using pure hardware. The buffer block management circuit 104 is arranged to communicate with the software SW (which runs on the processor 12) through the registers 102_1-102_M, and manage a buffer 18 (particularly, a plurality of buffer blocks 20_1-20_N configured in the buffer 18) in the storage medium (e.g., memory 14) to thereby allow the software SW to perform data access (data reading and data writing) upon the buffer blocks 20_1-20_N. In addition, the buffer block management circuit 104 is further arranged to maintain a buffer block record table 106 and a plurality of utilization progress pointers 108_1-108_K for use with the buffer block record table 106. For example, the buffer block record table 106 and the utilization progress pointers 108_1-108_K may be stored in an internal storage component (not shown) of the buffer block management circuit 104. Management tasks of the buffer 18 (particularly, buffer blocks 20_1-20_N configured in buffer 18) that are accomplished through using pure hardware may include initialization of a buffer block record table, buffer block allocation, buffer block release (recycle), and deinitialization of the buffer block record table. Details of these management tasks will be described below with reference to the accompanying drawings.

Figure 2:
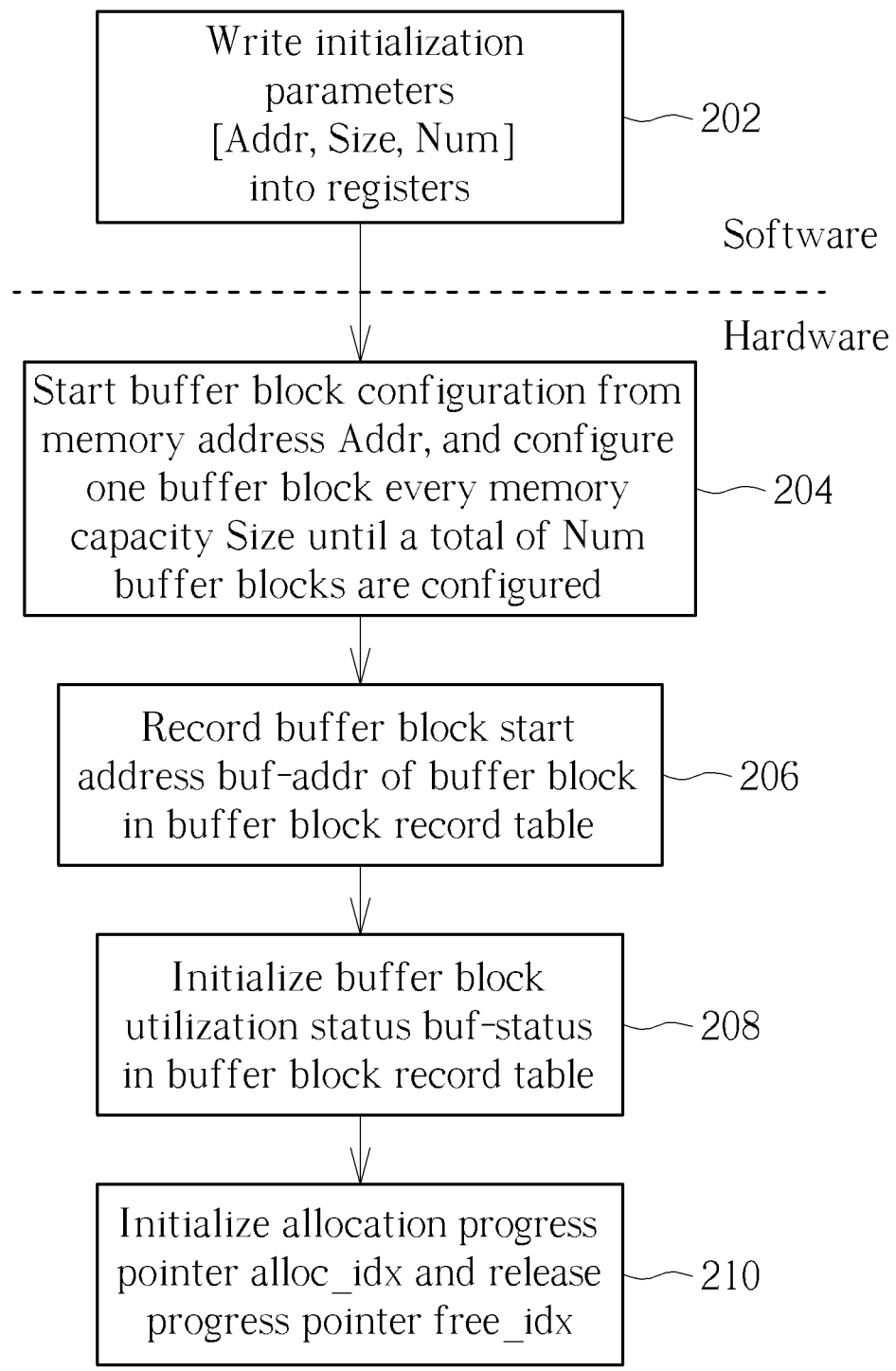
FIG. 2 is a flowchart illustrating an initialization operation of a buffer block record table according to an embodiment of the present invention.
Figure 3:
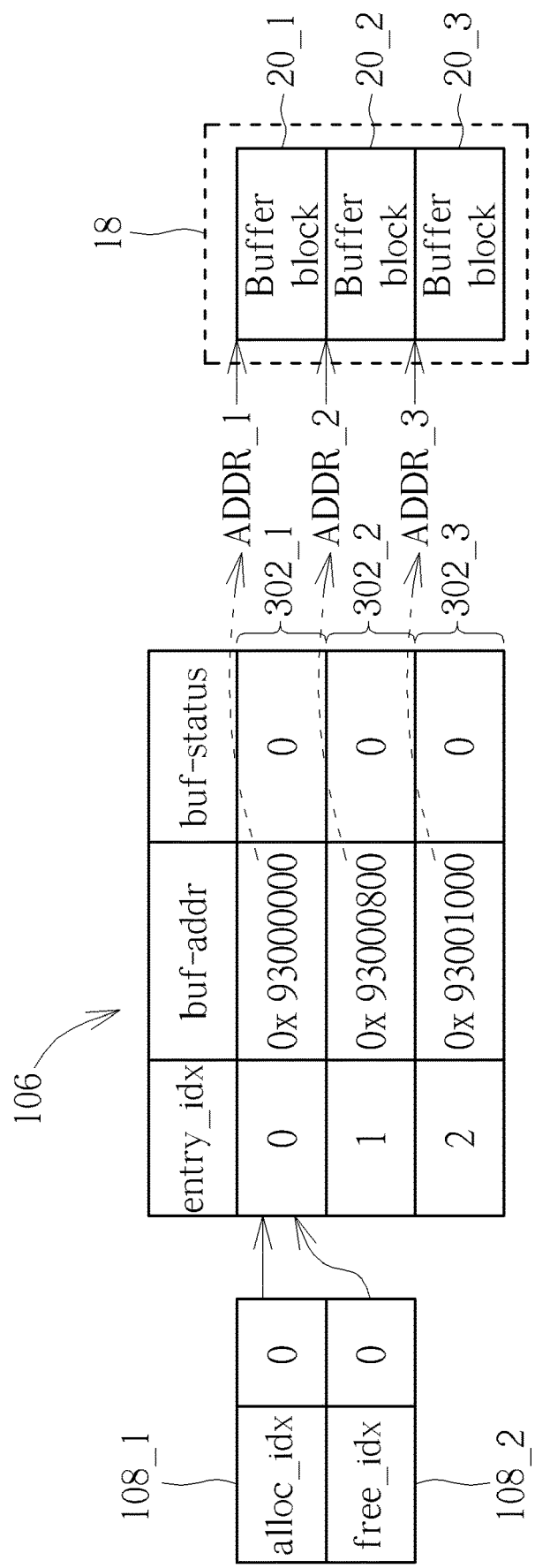
FIG. 3 is a diagram illustrating an example of the buffer block record table to which the initialization operation corresponds.

Please refer to FIG. 2 in conjunction with FIG. 3. FIG. 2 is a flowchart illustrating an initialization operation of a buffer block record table according to an embodiment of the present invention. FIG. 3 is a diagram illustrating an example of the buffer block record table to which the initialization operation corresponds. It should be noted that, if the result is substantially the same, steps of the initialization operation are not required to be executed in the exact order shown in FIG. 2. In this embodiment, the buffer block record table 106 includes a plurality of table entries such as table entries 302_1, 302_2, and 302_3 illustrated in FIG. 3, where each of the table entries 302_1, 302_2, and 302_3 records a table entry index entry_idx, a buffer block start address buf-addr, and a buffer block utilization status buf-status. In addition, regarding the utilization progress pointers 108_1-108_K (e.g., K=2) for use with the buffer block record table 106, the utilization progress pointer 108_1 may be an allocation progress pointer alloc_idx, and the utilization progress pointer 108_2 may be a release progress pointer free_idx, wherein the allocation progress pointer alloc_idx is used to indicate a table entry index of a next buffer block to be allocated, and the release progress pointer free_idx is used to indicate a table entry index of a next buffer block to be released.

When in initialization, the software SW running on the processor 12 is responsible for reserving and locking a storage space in the storage medium (e.g., memory 14) that is used to act as the buffer 18. At step 202, the software SW running on the processor 12 writes a plurality of initialization parameters [Addr, Size, Num] into a plurality of specific registers included in the registers 102_1-102_M, respectively. At step 204, in response to the software SW writing initialization parameters [Addr, Size, Num] into the specific registers, the buffer block management circuit 104 reads the specific registers, and configures the buffer blocks 20_1-20_M in the storage medium (e.g., memory 14) according to the initialization parameters [Addr, Size, Num]. Specifically, the buffer block management circuit 104 starts buffer block configuration on the memory 14 from the memory address Addr, and configures one buffer block every memory capacity Size until a total of Num (e.g., Num=M) buffer blocks are configured.

At step 206, the buffer block management circuit 104 records buffer block start addresses of the buffer blocks 20_1-20_M into a plurality of table entries in the buffer block record table 106, respectively. For example, assuming that the number of buffer blocks 20_1-20_M is 3 (i.e., Num=M=3) and the buffer block start addresses of the buffer blocks 20_1, 20_2, and 20_3 in the memory 14 are Addr_1, Addr_2, and Addr_3, respectively, where Addr_1=Addr, Addr_2−Addr_1=Size, and Addr_3−Addr_2=Size. The buffer block management circuit 104 records the buffer block start addresses Addr_1, Addr_2, and Addr_3 of the buffer blocks 20_1-20_M (M=3) in the table entries 302_1, 302_2, and 302_3, respectively. As shown in FIG. 3, the table entry indexes of the table entries 302_1, 302_2, and 302_3 are 0, 1, and 2, respectively. In addition, the buffer block start addresses Addr_1, Addr_2, and Addr_3 are 0x93000000, 0x93000800, and 0x93001000, respectively. Hence, the buffer block start address buf-addr of the table entry 302_1 records 0x93000000, the buffer block start address buf-addr of the table entry 302_2 records 0x93000800, and the buffer block start address buf-addr of the table entry 302_3 records 0x93001000.

At step 208, the buffer block management circuit 104 initializes buffer block utilization statuses buf-status in a plurality of table entries included in the buffer block record table 106. As shown in FIG. 3, the buffer block utilization statuses buf-status of the table entries 302_1-302_3 are all assigned by 0's to indicate that the buffer blocks 20_1-20_M (M=3) corresponding to the block buffer start addresses buf-addr (e.g., 0x93000000, 0x93000800, and 0x93001000) recorded in the table entries 302_1-302_3 are not allocated yet and are currently idle.

At step 210, the buffer block management circuit 104 initializes the allocation progress pointer alloc_idx and the release progress pointer free_idx. As shown in FIG. 3, since the buffer blocks 20_1-20_M (M=3) are not allocated currently, the allocation progress pointer alloc_idx and the release progress pointer free_idx are both initialized by 0's (i.e., alloc_idx=0 and free_idx=0). In other words, both pointers point to the first table entry 302_1 (which has entry_idx=0) of the buffer block record table 106 in the beginning.

Figure 4:
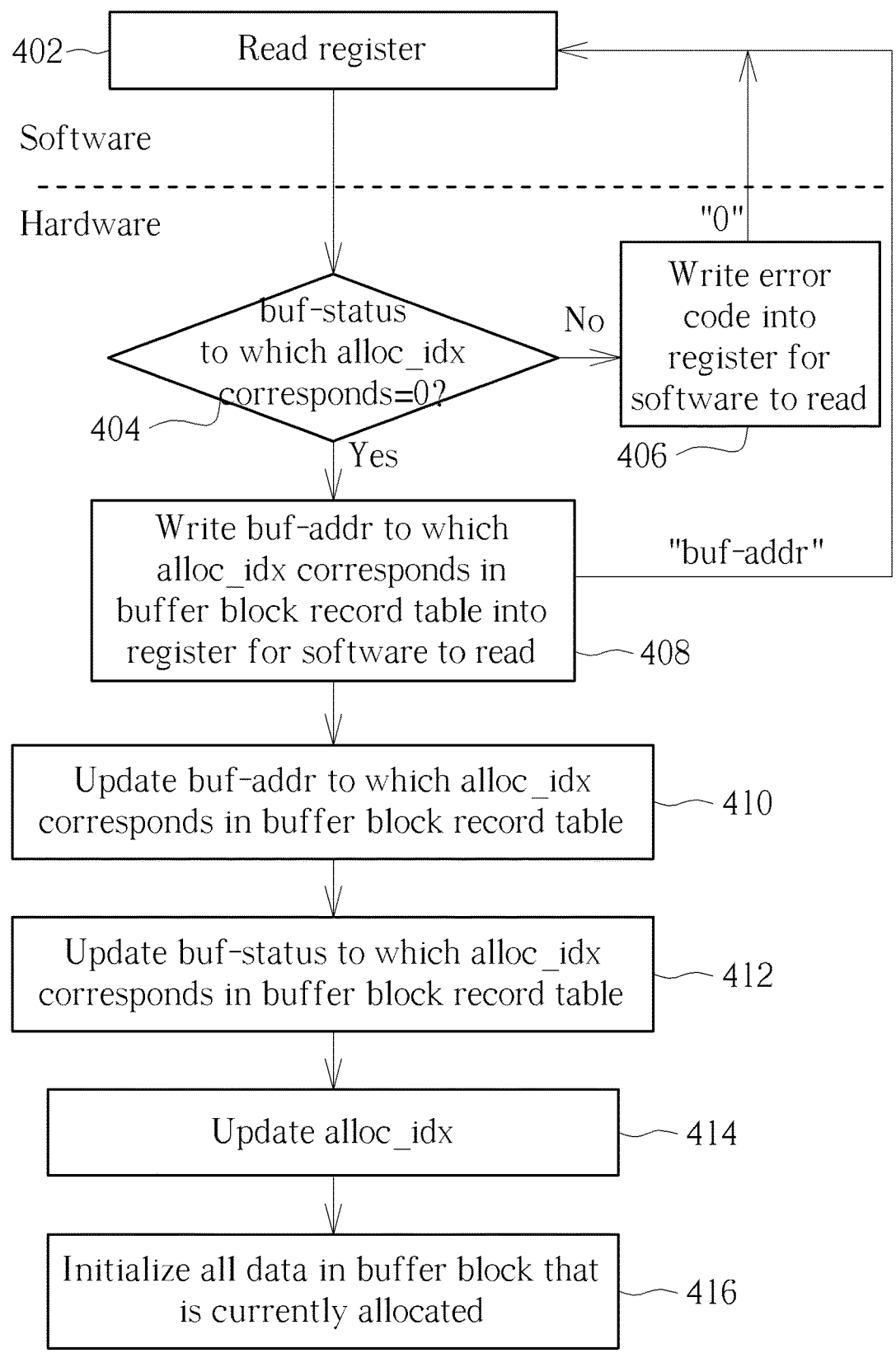
FIG. 4 is a flowchart illustrating an allocation operation of a buffer block according to an embodiment of the present invention.
Figure 5:
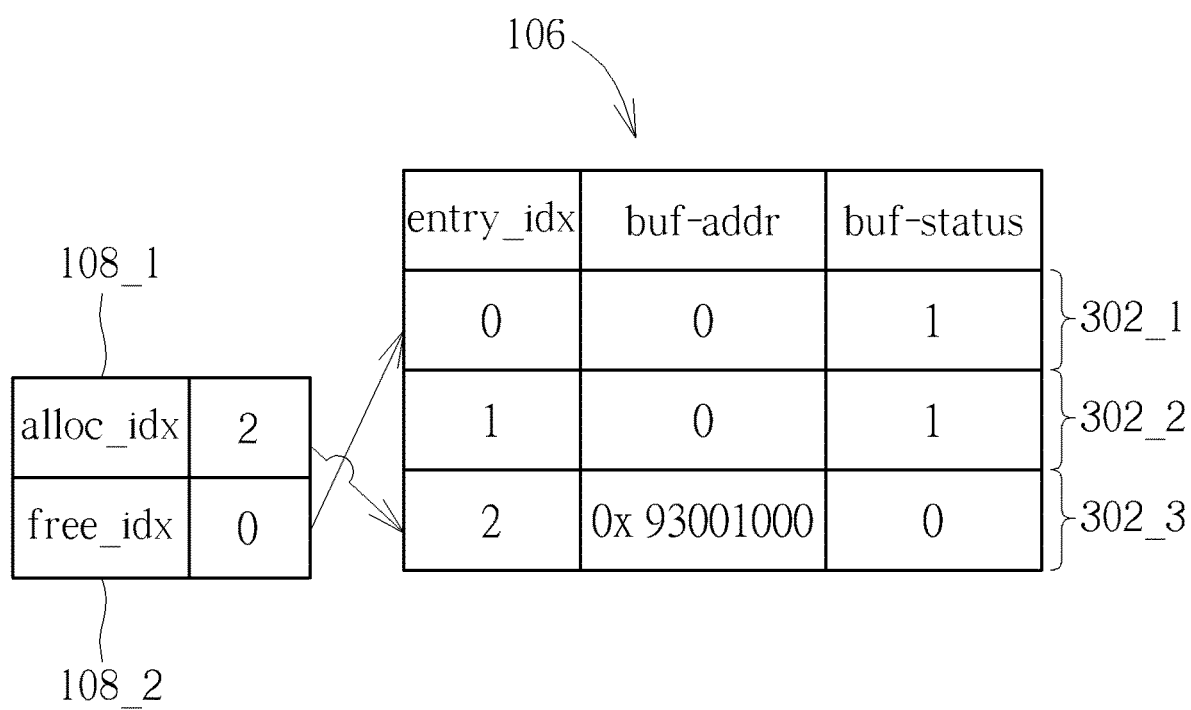
FIG. 5 is a diagram illustrating an example of the buffer block record table to which the allocation operation corresponds.

Please refer to FIG. 4 in conjunction with FIG. 5. FIG. 4 is a flowchart illustrating an allocation operation of a buffer block according to an embodiment of the present invention. FIG. 5 is a diagram illustrating an example of the buffer block record table to which the allocation operation corresponds. It should be noted that, if the result is substantially the same, steps of the allocation operation are not required to be executed in the exact order shown in FIG. 4. At step 402, the software SW running on the processor 12 reads a specific register included in the registers 102_1-102_M. At step 404, in response to the software SW reading the specific register, the buffer block management circuit 104 refers to a specific buffer block utilization status buf-status recorded in a specific table to which the application progress point alloc_idx corresponds, to determine whether to write a specific buffer block start address buf-addr recorded in the specific table entry into the specific register for software SW to read. If the specific buffer block utilization status buf-status is 1, it means that a specific buffer block with the specific buffer block start address has been allocated and is currently in use. Since the allocation progress pointer alloc_idx is used to indicate a table entry index of a next buffer block to be allocated, it means that all of the buffer blocks 20_1-20_M in the buffer 18 have been allocated and are currently in use, and there is no buffer block that can be allocated to and used by the software SW. Hence, the buffer block management circuit 104 writes an error code (e.g., 0) into the specific register for software SW to read, where the error code is used to inform the software SW of an allocation failure of a buffer block.

If the specific buffer block utilization status buf-status is 0, it means that a specific buffer block with the specific buffer block start address is not allocated yet and is currently idle. This also means that the buffer 18 has a buffer block that can be allocated to and used by the software SW. Hence, the application operation proceeds with step 408. At step 408, in response to the specific buffer block utilization status buf-status (buf-status=0) indicating that the specific buffer block with the specific buffer block start address is not allocated currently, the buffer block management circuit 104 writes the specific buffer block start address buf-addr into the specific register for software SW to read, where the specific buffer block start address buf-addr is used to inform that the software SW can use the specific buffer block to which the specific buffer block start address buf-addr corresponds for subsequent data access. Next, since the specific buffer block to which the specific buffer block start address buf-addr corresponds is now allocated to the software SW for data access, the specific buffer block to which the specific buffer block start address buf-addr corresponds can not be allocated again. Hence, at step 410, the buffer block management circuit 104 further updates the specific buffer block start address buf-addr originally recorded in the specific table entry to which the allocation progress pointer alloc_idx corresponds. For example, the specific buffer block start address buf-addr originally recorded in the specific table entry to which the allocation progress pointer alloc_idx corresponds is reset to a default value (e.g., 0).

Since the specific buffer block to which the specific buffer block start address buf-addr corresponds is now allocated to the software SW for data access, the buffer block management circuit 104 further updates the specific buffer block utilization status buf-status originally recorded in the specific table entry, for example, by changing the specific buffer block utilization status buf-status from 0 to 1 after the specific buffer block start address buf-addr is written into the specific register (step 412).

At step 414, the buffer block management circuit 104 updates the allocation progress pointer alloc_idx. Since the allocation progress pointer alloc_idx is used to indicate a table entry index of a next buffer block to be allocated, the buffer block management circuit 104 increments the allocation progress pointer alloc_idx by 1 (i.e., alloc_idx=alloc_idx+1). In addition, the buffer block record table 106 employs a circular data structure, such that table entries of the buffer block record table 106 are repeatedly used in a circular manner. When a resulting value of the allocation progress pointer alloc_idx incremented by 1 (i.e., alloc_idx=alloc_idx+1) exceeds the maximum table entry (e.g., entry_idx=2), the allocation progress pointer alloc_idx wraps around and is reset to the minimum table entry index (e.g., entry_idx=0).

At step 416, the buffer block management circuit 104 initializes all data in the buffer block that is currently allocated to the software SW, for example, by writing default padding values (e.g., 0's) into all bits included in the buffer block. Subsequently, the software SW performs data access upon the initialized buffer block.

Suppose that, after the initialization operation of the buffer block record table 106 is accomplished, the buffer block 302_1 (which has the buffer block start address 0x93000000) and the buffer block 302_2 (which has the buffer block start address 0x93000800) are sequentially allocated to the software SW running on the processor 12, as shown in FIG. 5. Regarding the first-time buffer block allocation requested by the software SW, since the initial value of the allocation progress pointer alloc_idx is 0, the buffer block start address buf-adder=0x93000000 originally recorded in the table entry 302_1 is used to act as a register value for software SW to read. Next, the buffer block start address buf-adder recorded in the table entry 302_1 is updated to 0 from 0x93000000, and the buffer block utilization status buf-status recorded in the table entry 302_1 is updated to 1 from 0. In addition, the allocation progress pointer alloc_idx is updated to 1 from 0. Regarding the second-time buffer block allocation requested by the software SW, since the current value of the allocation progress pointer alloc_idx is 1, the buffer block start address buf-adder=0x93000800 originally recorded in the table entry 302_2 is used to act as a register value for software SW to read. Next, the buffer block start address buf-adder recorded in the table entry 302_2 is updated to 0 from 0x93000800, and the buffer block utilization status buf-status recorded in the table entry 302_2 is updated to 1 from 0. In addition, the allocation progress pointer alloc_idx is updated to 2 from 1.

Figure 6:
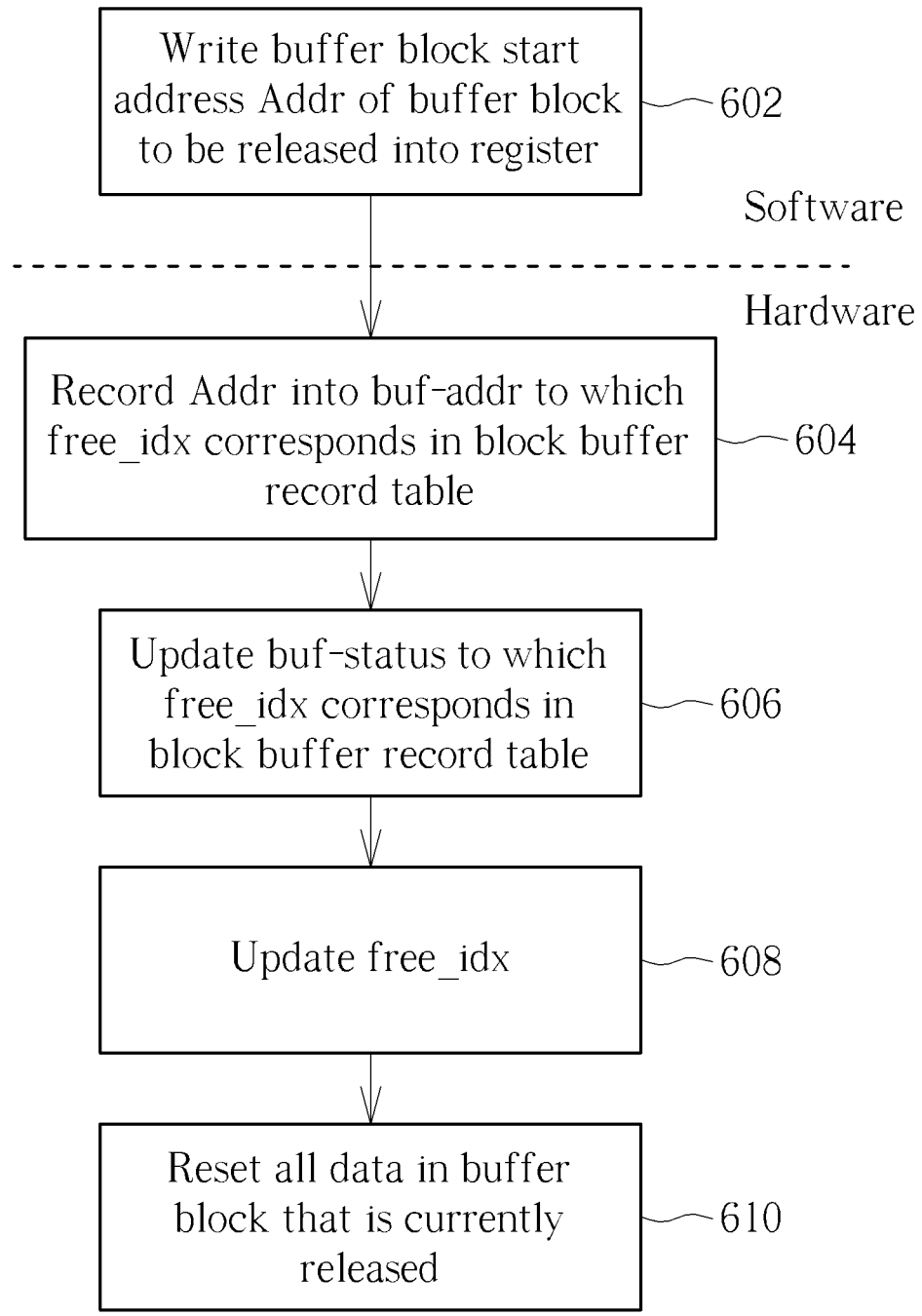
FIG. 6 is a diagram illustrating a release (recycle) operation of a buffer block according to an embodiment of the present invention.
Figure 7:
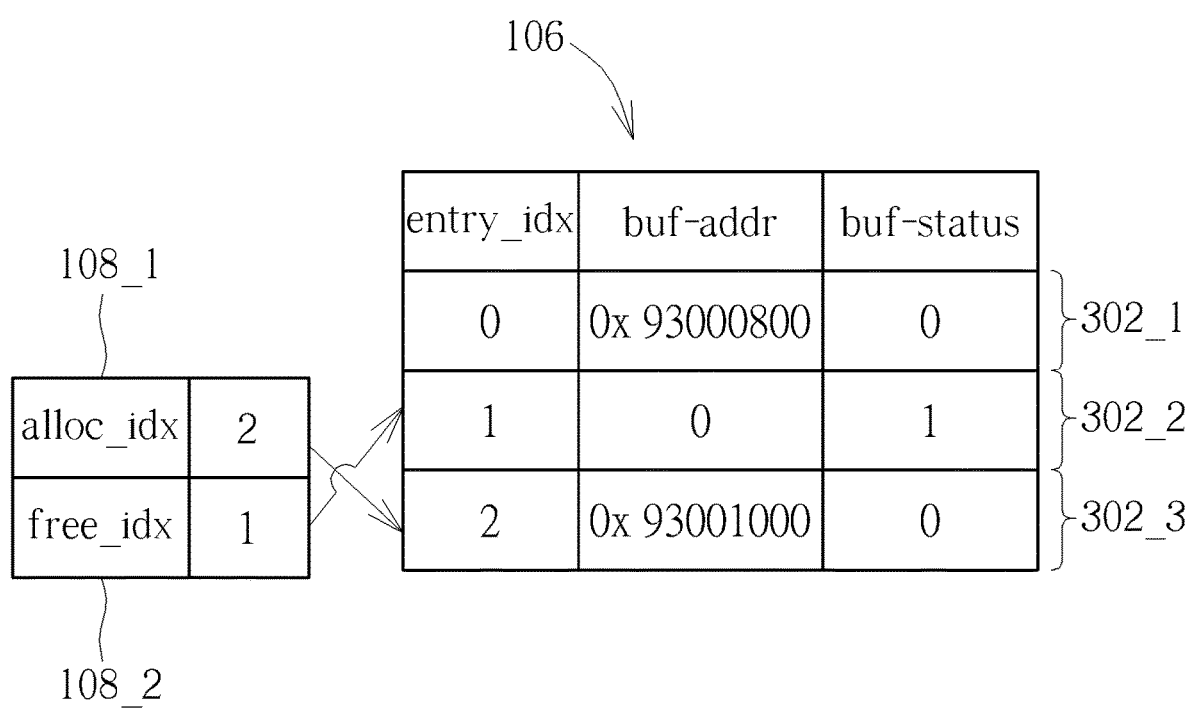
FIG. 7 is a diagram illustrating an example of the buffer block record table to which the release (recycle) operation corresponds.

Please refer to FIG. 6 in conjunction with FIG. 7. FIG. 6 is a diagram illustrating a release (recycle) operation of a buffer block according to an embodiment of the present invention. FIG. 7 is a diagram illustrating an example of the buffer block record table to which the release (recycle) operation corresponds. It should be noted that, if the result is substantially the same, steps of the initialization operation are not required to be executed in the exact order shown in FIG. 6. When receiving a "TX Done (network packet(s) have been forwarded)" notification, the software SW running on the processor 12 requests that a certain buffer block originally used for buffering data of the network packet (s) should be released/freed. At step 602, the software SW running on the processor 12 writes a specific buffer block start address Addr of a specific buffer block to be released into a specific register included in the registers 102_1-102_M. In response to the software SW writing the specific buffer block start address Addr into the specific register, the buffer block management circuit 104 writes the specific buffer block start address Addr into a specific table entry to which the release progress pointer free_idx corresponds (step 604), and updates a specific buffer block utilization status recorded in the specific table entry (step 606), for example, by changing the specific buffer block utilization status from 1 to 0.

At step 608, the buffer block management circuit 104 updates the release progress pointer free_idx. Since the release progress pointer free_idx is used to indicate a table entry index of a next buffer block to be released, the buffer block management circuit 104 increments the release progress pointer free_idx by 1 (i.e., free_idx=free_idx+1). Furthermore, as mentioned above, the buffer block record table 106 employs a circular data structure, such that table entries of the buffer block record table 106 are repeatedly used in a circular manner. When a resulting value of the release progress pointer free_idx incremented by 1 (i.e., free_idx=free_idx+1) exceeds the maximum table entry (e.g., entry_idx=2), the release progress pointer free_idx wraps around and is reset to the minimum table entry index (e.g., entry_idx=0).

At step 610, the buffer block management circuit 104 resets all data in the buffer block that is to be released as currently requested by the software SW, for example, by resetting all bits included in the buffer block to default padding values (e.g., 0's). Subsequently, the reset buffer block may be allocated to the software SW for data access again.

Suppose that, after the initialization operation of the buffer block record table 106 is accomplished, the buffer block 302_1 (which has the buffer block start address 0x93000000) and the buffer block 302_2 (which has the buffer block start address 0x93000800) are sequentially allocated to the software SW running on the processor 12. When the software SW running on the processor 102 receives a "TX Done (network packet(s) have been forwarded)" notification and requests that the buffer block 302_2 (which has the buffer block start address 0x93000800) should be released/freed. As shown in FIG. 7, since the initial value of the release progress pointer free_idx is 0, the buffer block start address buf-adder currently recorded in the table entry 302_1 is updated to 0x93000800 from 0. Next, the buffer block utilization status buf-status recorded in the table entry 302_1 is updated to 0 from 1. In addition, the release progress pointer free_idx is updated to 1 from 0.

Figure 8:
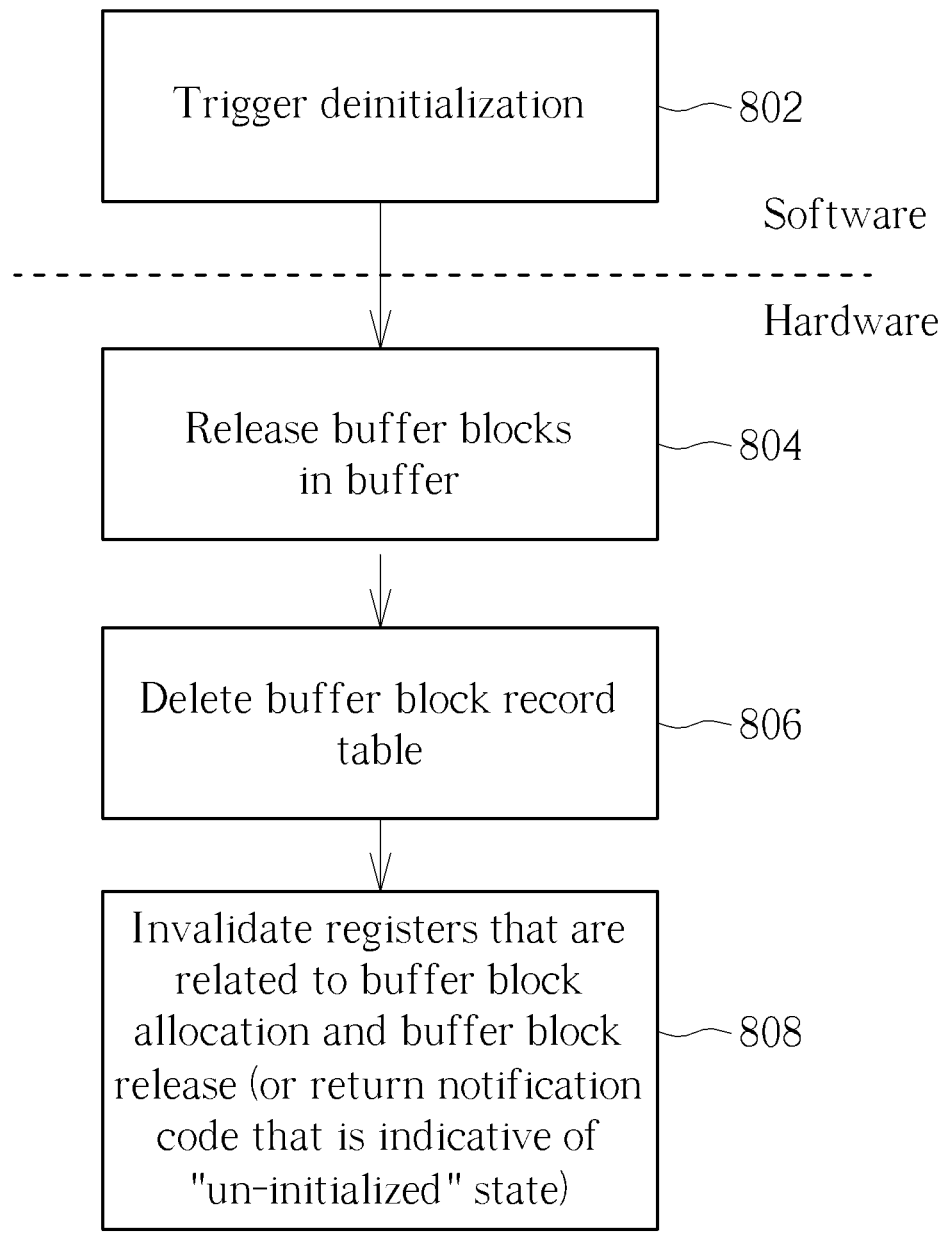
FIG. 8 is a flowchart illustrating a deinitialization operation of a buffer block record table according to an embodiment of the present invention.

FIG. 8 is a flowchart illustrating a deinitialization operation of a buffer block record table according to an embodiment of the present invention. It should be noted that, if the result is substantially the same, steps of the deinitialization operation are not required to be executed in the exact order shown in FIG. 8. At step 802, the software SW running on the processor 12 triggers the deinitialization operation. For example, the buffer block management circuit 104 is triggered to perform the deinitialization operation through a specific register included on the registers 102_1-102_M. In response to the software SW triggering the deinitialization operation, the buffer block management circuit 104 releases buffer blocks 20_1-20_M in the buffer 18 (step 804), deletes the buffer block record table 106 (step 806), and invalidates registers that are included in the registers 102_1-102_M (which act as an interface between software and pure hardware) and are related to buffer block allocation and buffer block release (or returns a notification code that is indicative of an "un-initialization" state) (step 808).

As mentioned above, the buffer management apparatus and buffer block management method proposed by the present invention use pure hardware to manage buffer blocks configured in the storage medium. For example, management tasks that is accomplished through using pure hardware may include initialization of a buffer block record table, buffer block allocation, buffer block release (recycle), and deinitialization of the buffer block record table. By using pure hardware to deal with buffer management, buffer management can be performed without intervention of the software, thus preventing those issues encountered by the conventional design that uses software to deal with buffer management.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A buffer management apparatus comprising:
a plurality of registers; and
a buffer block management circuit, arranged to communicate with software through the plurality of registers, and utilize pure hardware to manage a plurality of buffer blocks configured in a storage medium, for allowing the software to perform data access upon the plurality of buffer blocks;
wherein the buffer block management circuit is further arranged to maintain a buffer block record table and an allocation progress pointer; the buffer block record table comprises a plurality of table entries, each recording a table entry index, a buffer block start address and a buffer block utilization status; the allocation progress pointer is arranged to indicate a table entry index of a next buffer block to be allocated; and in response to the software reading a specific register included in the plurality of registers, the buffer block management circuit refers to a specific buffer block utilization status recorded in a specific table entry to which the allocation progress pointer corresponds, to determine whether to write a specific buffer block start address recorded in the specific table entry into the specific register for the software to read.

2. The buffer management apparatus of claim 1, wherein the buffer block management circuit is further arranged to maintain a plurality of utilization progress pointers for use with the buffer block record table, and the plurality of utilization progress pointers comprise the allocation progress pointer.

3. The buffer management apparatus of claim 2, wherein the plurality of utilization progress pointers further comprise a release progress pointer, and the release progress pointer is arranged to indicate a table entry index of a next buffer block to be released.

4. The buffer management apparatus of claim 3, wherein in response to the software writing another specific buffer block start address into another specific register included in the plurality of registers, the buffer block management circuit records the another specific buffer block start address in another specific table entry to which the release progress pointer corresponds, updates another specific buffer block utilization status recorded in the another specific table entry, and updates the release progress pointer.

5. The buffer management apparatus of claim 3, wherein in response to the software triggering deinitialization, the buffer block management circuit releases the plurality of buffer blocks, deletes the buffer block record table, and invalidates registers that are included in the plurality of registers and are related to buffer block allocation and buffer block release.

6. The buffer management apparatus of claim 1, wherein in response to the specific buffer block utilization status indicating that a specific buffer block with the specific buffer block start address is not allocated currently, the buffer block management circuit writes the specific buffer block start address into the specific register for the software to read.

7. The buffer management apparatus of claim 6, wherein after writing the specific buffer block start address into the specific register, the buffer block management circuit further updates the specific buffer block start address and the specific buffer block utilization status recorded in the specific table entry, and updates the allocation progress pointer.

8. The buffer management apparatus of claim 1, wherein in response to the specific buffer block utilization status indicating that a buffer block with the specific buffer block start address is allocated currently, the buffer block management circuit writes an error code into the specific register for the software to read.

9. A buffer management method comprising:
   enabling communication between pure hardware and software through a plurality of registers; and
   utilizing the pure hardware to manage a plurality of buffer blocks configured in a storage medium, for allowing the software to perform data access upon the plurality of buffer blocks;
   wherein utilizing the pure hardware to manage the plurality of buffer blocks configured in the storage medium comprises:
   maintaining a buffer block record table and an allocation progress pointer, wherein the buffer block record table comprises a plurality of table entries, each recording a table entry index, a buffer block start address and a buffer block utilization status; and the allocation progress pointer is arranged to indicate a table entry index of a next buffer block to be allocated; and
   in response to the software reading a specific register included in the plurality of registers, referring to a specific buffer block utilization status recorded in a specific table entry to which the allocation progress pointer corresponds, to determine whether to write a specific buffer block start address recorded in the specific table entry into the specific register for the software to read.

10. The buffer management method of claim 9, wherein utilizing the pure hardware to manage the plurality of buffer blocks configured in the storage medium further comprises:
    maintaining a plurality of utilization progress pointers for use with the buffer block record table, wherein the plurality of utilization progress pointers comprise the allocation progress pointer.

11. The buffer management method of claim 10, wherein the plurality of utilization progress pointers further comprise a release progress pointer, and the release progress pointer is arranged to indicate a table entry index of a next buffer block to be released.

12. The buffer management method of claim 11, wherein utilizing the pure hardware to manage the plurality of buffer blocks configured in the storage medium further comprises:
    in response to the software writing another specific buffer block start address into another specific register included in the plurality of registers, recording the another specific buffer block start address in another specific table entry to which the release progress pointer corresponds, updating another specific buffer block utilization status recorded in the another specific table entry, and updating the release progress pointer.

13. The buffer management method of claim 11, wherein utilizing the pure hardware to manage the plurality of buffer blocks configured in the storage medium further comprises:
    in response to the software triggering deinitialization, releasing the plurality of buffer blocks, deleting the buffer block record table, and invalidating registers that are included in the plurality of registers and are related to buffer block allocation and buffer block release.

14. The buffer management method of claim 9, wherein utilizing the pure hardware to manage the plurality of buffer blocks configured in the storage medium further comprises:
    in response to the specific buffer block utilization status indicating that a specific buffer block with the specific buffer block start address is not allocated currently, writing the specific buffer block start address into the specific register for the software to read.

15. The buffer management method of claim 14, wherein utilizing the pure hardware to manage the plurality of buffer blocks configured in the storage medium further comprises:
    after the specific buffer block start address is written into the specific register, updating the specific buffer block start address and the specific buffer block utilization status recorded in the specific table entry, and updating the allocation progress pointer.

16. The buffer management method of claim 11, wherein utilizing the pure hardware to manage the plurality of buffer blocks configured in the storage medium further comprises:
    in response to the specific buffer block utilization status indicating that a buffer block with the specific buffer block start address is allocated currently, writing an error code into the specific register for the software to read.

17. A buffer management apparatus comprising:
    a plurality of registers; and
    a buffer block management circuit, arranged to communicate with software through the plurality of registers, and utilize pure hardware to manage a plurality of buffer blocks configured in a storage medium, for allowing the software to perform data access upon the plurality of buffer blocks;
    wherein the buffer block management circuit is further arranged to maintain a buffer block record table and a plurality of utilization progress pointers for use with the buffer block record table, and manage the plurality of buffer blocks according to the buffer block record table and the plurality of utilization progress pointers; the buffer block record table comprises a plurality of table entries, each recording a table entry index, a buffer block start address and a buffer block utilization status; the plurality of utilization progress pointers comprise an allocation progress pointer and a release progress pointer, the allocation progress pointer is arranged to indicate a table entry index of a next buffer block to be allocated, and the release progress pointer is arranged to indicate a table entry index of a next buffer block to be released; and in response to the software writing a plurality of initialization parameters into a plurality of specific registers included in the plurality of registers, the buffer block management circuit configures the plurality of buffer blocks in the storage medium according to the plurality of initialization parameters, records buffer block start addresses of the plurality of buffer blocks into the plurality of table entries, respectively, initializes buffer block utilization statues recorded in the plurality of table entries, and initializes the allocation progress pointer and the release progress pointer.

18. A buffer management method comprising:
    enabling communication between pure hardware and software through a plurality of registers; and
    utilizing the pure hardware to manage a plurality of buffer blocks configured in a storage medium, for allowing the software to perform data access upon the plurality of buffer blocks;
    wherein utilizing the pure hardware to manage the plurality of buffer blocks configured in the storage medium comprises:
    maintaining a buffer block record table and a plurality of utilization progress pointers for use with the buffer block record table, wherein the buffer block record table comprises a plurality of table entries, each recording a table entry index, a buffer block start address and a buffer block utilization status; and the plurality of utilization progress pointers comprise an allocation progress pointer and a release progress pointer, the allocation progress pointer is arranged to indicate a table entry index of a next buffer block to be allocated, and the release progress pointer is arranged to indicate a table entry index of a next buffer block to be released;

managing the plurality of buffer blocks according to the buffer block record table and the plurality of utilization progress pointers; and in response to the software writing a plurality of initialization parameters into a plurality of specific registers included in the plurality of registers, configuring the plurality of buffer blocks in the storage medium according to the plurality of initialization parameters, recording buffer block start addresses of the plurality of buffer blocks into the plurality of table entries, respectively, initializing buffer block utilization statues recorded in the plurality of table entries, and initializing the allocation progress pointer and the release progress pointer.

* * * * *